United States Patent [19]
Schneider

[11] Patent Number: 5,919,253
[45] Date of Patent: Jul. 6, 1999

[54] HOT-SWITCHABLE SCSI CONTROLLER HAVING OUTPUT DRIVERS WITH QUICK TURN-ON

[75] Inventor: Thomas R. Schneider, Anaheim, Calif.

[73] Assignee: Adaptec, Inc., Milpitas, Calif.

[21] Appl. No.: 08/882,198

[22] Filed: Jun. 25, 1997

[51] Int. Cl.$^6$ .................................................. G06F 13/00
[52] U.S. Cl. .......................................... 710/103; 709/301
[58] Field of Search .............................. 710/103; 709/301

[56] References Cited

U.S. PATENT DOCUMENTS

| | | | |
|---|---|---|---|
| 5,345,357 | 9/1994 | Pianka | 361/56 |
| 5,751,978 | 5/1998 | Tipple | 395/309 |
| 5,832,244 | 11/1998 | Jolley et al. | 395/309 |
| 5,862,350 | 1/1999 | Coulson | 395/283 |

Primary Examiner—Ayaz R. Sheikh
Assistant Examiner—David A. Wiley
Attorney, Agent, or Firm—Christie, Parker & Hale, LLP

[57] ABSTRACT

An integrated circuit provides for an output driver having a quick turn-on characteristic as well as a maximum $V_{OH}$ level limited to the maximum SCSI specification limit. The output driver's $V_{OH}$ is controlled by a resistor divider network, connected between a pull-up signal source and a pull-up output device, and which functions to reduce the gate voltage on the output device such that its maximum $V_{OH}$ level is limited to the SCSI specification. The quick turn-on characteristic is implemented by coupling a transfer gate in parallel with the series resistor of the resistor divider network, and bypassing the series resistor during a first portion of the pull-up turn-on time of the output driver. A feedback circuit is connected between the output driver output and the transfer gate bypass circuit, in order to turn the transfer gate off when the output voltage reaches a particular trigger value, thus removing the bypass from the series resistor and allowing the resistor divider network to function normally and limit the output driver's pull-up to the maximum SCSI $V_{OH}$ limit. The transfer gate is further configured to allow an SCSI device incorporating the circuit to be hot-switched onto and off of an active SCSI bus.

23 Claims, 3 Drawing Sheets

HOT-SWITCHABLE SCSI CONTROLLER HAVING OUTPUT DRIVERS WITH QUICK TURN-ON

FIELD OF THE INVENTION

The present invention relates generally to electronic systems having a high-speed SCSI interface. In particular, the invention relates to an integrated circuit, adapted to be hot-switchable connected to a high speed SCSI bus, in which the output driver $V_{OH}$ is limited to 3.8 volts and exhibits a quick turn-on.

BACKGROUND OF THE INVENTION

The SCSI interface may be best described as a device independent input/output bus which allows a variety of peripheral devices to be connected to a personal computer system. SCSI refers to Small Computer Systems Interface, and was initially developed to provide a disk drive interface that supported logical addressing of data rather than the more prevalent physical addressing. In addition, the SCSI interface was developed to transfer information in parallel, byte-wise fashion instead of serially, thus, ending certain compatibility difficulties associated with developing new disk drive technologies and bringing them to the marketplace. The electrical characteristics and signal protocols of the SCSI interface were developed in such a manner that the requirements of various peripheral devices could be accommodated with relative ease and flexibility. In particular, the SCSI interface protocol defines a number of commands which are available for accessing and querying a particular peripheral device regarding the parameter set required for the device to operate correctly. This particular feature of the SCSI interface makes it possible for a system designer to write a software device driver program for a generalized peripheral device, without regard to device specific parameter set details.

In accordance with the various versions of the SCSI interface, such as, SCSI-1, SCSI-2, and SCSI-3, anywhere from 8 to 32 individual peripheral devices can be addressed on an SCSI bus depending on the width of the bus (8-bit, 16-bit or 32-bit bus width). These devices are generally categorized as initiators and targets, with any particular peripheral device able to play either role at a particular point in time. Specifically, a peripheral device functioning as an initiator, is a device that initiates an information transaction or data transfer by giving another peripheral device a particular task to perform. An example of an initiator might well be the SCSI host adapter of a personal computer system, while an example of a typical target device might well be a rotating disk data storage system such as a hard disk drive or CD-ROM. A target peripheral device may be thus seen as the device which carries out the task identified by the initiator.

Figure 1A:
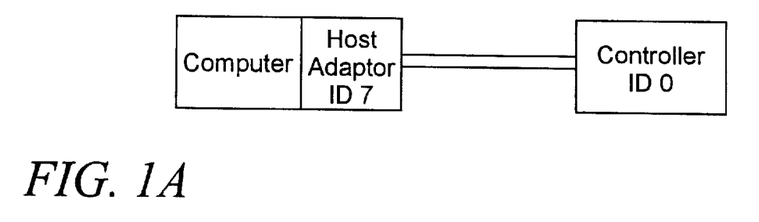
FIG. 1A is a semi-schematic block diagram of a lightly loaded SCSI bus including a single target and a single initiator.
Figure 1B:
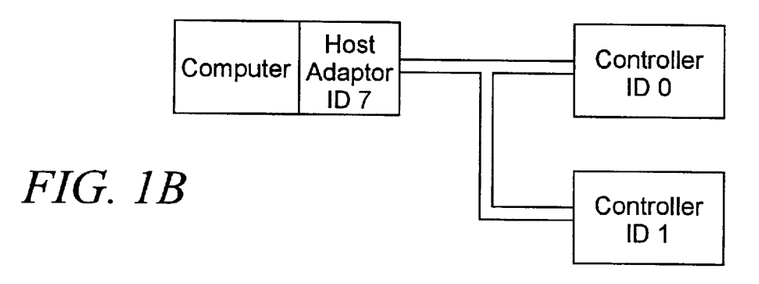
FIG. 1B is a semi-schematic block level diagram of a moderately populated SCSI bus including a single initiator and multiple target devices.
Figure 1C:
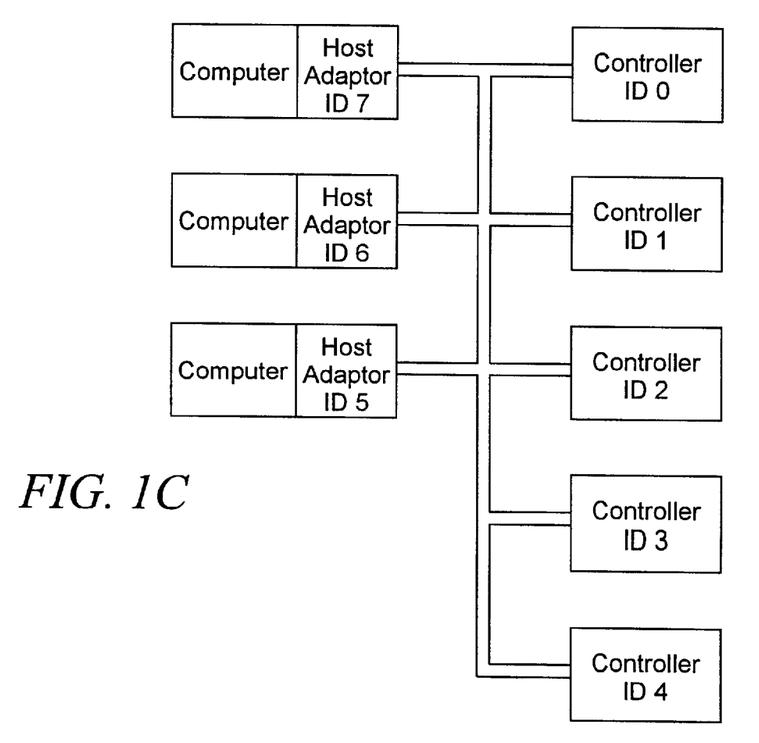
FIG. 1C is a semi-schematic block level diagram of a heavily populated SCSI bus including multiple initiators and multiple target devices.

As was mentioned previously, and as is depicted in the generalized block diagrams of FIGS. 1A, 1B and 1C, an SCSI interface bus configuration may have any combination of initiator and target devices, so long as the total does not exceed the number allowed by the bus width (8, 16 or 32). Particular basic SCSI configurations illustrated in FIG. 1A include a single initiator, single target configuration such as a computer system host adapter coupled to an SCSI hard disk controller; a single initiator, multiple target configuration, such as a computer system host adapter coupled to a hard disk drive and a CD-ROM is depicted in FIG. 1B; and FIG. 1C illustrates a multiple initiator, multiple target configuration, such as might obtain in a local area network in which multiple computer systems are connected to multiple printers, disk drives, CD-ROMs, and the like.

The SCSI bus may be from 8 to 32 bits wide, depending on configuration, with the standard SCSI bus being an 8-bit wide bus comprising 18 signals. In accord with the SCSI specification, these signals are either single ended active-low signals or differential signals defined by output driver circuitry on the initiator and target devices. The reason for this signal convention is that the SCSI bus is required to be terminated at both ends for proper operation. Passive termination is typically provided by termination resistors while active termination may be provided by any number of means well understood by those having skill in the art. In single ended mode, terminators (whether active or passive) are coupled to a power supply, which is preferably 5.0 volts, but may range from about 3.3 volts to about 6.0 volts, and function to pull-up the signal lines of the bus to about 2.5 to about 3.0 volts, thereby holding the signals inactive until an output driver pulls-down the signal line to an active low. Advantageously, termination in combination with an active-low signal level, makes possible to leave devices connected to the bus whose power has been turned-off. However, as will be described in greater below, termination often impacts with the ability of an output driver to meet certain other SCSI signal conventions, particularly with regard to the maximum pull-up voltage or $V_{OH}$.

In accordance with the specification for the SCSI FAST 20 interface, the signal swing of output drivers from a, for example, SCSI controller chip is defined as a minimum $V_{OL}$ of 0.0 volts to a maximum $V_{OH}$ of 3.7 volts DC. Although a larger $V_{OH}$ value would not necessarily degrade the signal performance of various SCSI integrated circuits coupled to the bus, taking $V_{OH}$ higher than about 3.8 volts does have a significant effect on the overall power consumption of the SCSI FAST 20 System. In particular, because inactive signal lines of the bus are pulled-up to approximately 2.5 volts by the terminators, it will be understood that if an active pull-up output driver were to pull an inactive signal up to a value exceeding 3.5 volts to about 3.8 volts, a significant voltage differential would be established between an output driver in the pull-up state and the bus, thus causing significant amounts of current to be sourced to the bus resulting in disadvantageous drops along the bus and very high power consumption. In addition, this tendency would be substantially magnified were the SCSI bus to be heavily populated, and in a generally inactive state. Such a situation would obtain where an SCSI FAST 20 bus was coupled between multiple initiators and multiple target devices, such as depicted in FIG. 1C, and where the host computer was engaged in processing operations requiring very few peripheral calls.

Such a $V_{OH}$ requirement (3.7 volts maximum) for SCSI FAST 20 output drivers, presents a significant challenge to an integrated circuit designer, when it is understood that the integrated circuits embodying such an output driver are typically coupled to a 5.0 volt supply voltage, and are generally fabricated using 0.5 micron CMOS process technology (at least as regards the more high-tech, contemporary SCSI circuits). In this technology, it is common for the output driver to be implemented using pull-up and pull-down N-channel transistors, with the threshold voltage ($V_T$) of the N-channel pull-up being commonly in the range from about 0.8 volts to about 1.0 volts. Accordingly, when an N-channel pull-up is turned-on, with a gate-source voltage ($V_{GS}$) of about 5.0 volts ($V_{DD}$) the output ($V_{GS}-V_T$) will exhibit a $V_{OH}$ of from about 4.0 to about 4.2 volts. This maximum $V_{OH}$ is out-of-spec on the high side, thus giving rise to potential power consumption problems.

Using an N-channel pull-up configuration, one method of reducing this output voltage is to reduce the gate-source voltage ($V_{GS}$) of the pull-up N-channel transistor. The gate voltage must accordingly be reduced from its conventional 5.0 volts ($V_{DD}$) value to some lower voltage, i.e., in the range of about 4.5 volts, max. Since the N-channel pull-up gate electrode is coupled to the output of a pull-up pre-driver which swings between 0 and 5 volts, one method of reducing $V_{GS}$ would be to provide a resistive voltage divider between the pull-up pre-driver and the gate terminal of the N-channel pull-up transistor to thereby reduce the gate voltage. Such voltage divider configurations commonly set up a voltage of approximately 4.5 to about 4.75 volts on the pull-up gate, thus limiting the output voltage to approximately 3.5 volts $V_{OH}$ maximum.

Use of such a resistor voltage divider, for example in the pre-driver section, for the N-channel pull-up, alleviates the $V_{OH}$ problem somewhat, but causes another problem in its place. Because the output driver must be capable of driving a heavily loaded bus, conventional N-channel pull-up transistors are constructed to be rather large. Specifically, N-channel pull-up transistors are fabricated as a 12 transistor array, with each transistor having a channel width (W) of approximately 50 microns and a channel length (L) of approximately 0.9 microns, thus giving an N-channel pull-up transistor with an effective gate area of approximately 550 square microns. It will thus be understood by those having skill in the art, that the N-channel pull-up transistor is not only a high current device but also a high capacitance device. The current that must charge up a 550 square micron capacitor (and thus turn-on the N-channel pull-up) must now be directed through a resistor, thus establishing a classic RC time constant for the N-channel pull-up charge time. The increase in N-channel pull-up charge time caused by conventional voltage dividers was significant in that the output driver could no longer be able to operate (i.e., switch from low to high) within the AC timing specifications of a for example, SCSI FAST 20 interface operating at modern-day speeds in the range of about 20 megahertz.

Accordingly, it will be seen that there is a need for some means to adjust the $V_{OH}$ characteristics of an output driver of a for example, SCSI controller, to limit the $V_{OH}$ to the SCSI specified maximum, while at the same time maintaining the ability of the output driver to switch within the required AC timing specifications. Such an output driver should be able to take advantage of conventional resistive voltage divider networks provided on conventional SCSI devices as a means to allow "hot-plugging" of the devices to a SCSI bus, without allowing such resistive voltage dividers to disadvantageously effect the charge time of an N-channel pull-up coupled to the bus.

SUMMARY OF THE INVENTION

One object of the present invention is to provide an output driver for an SCSI controller, for example, in which the $V_{OH}$ of the pull-up is limited to the SCSI specified maximum.

Another object of the present invention is to provide an output driver for an SCSI controller, for example, with a turn-on time in conformance with modem SCSI bus timing specifications operating within the FAST 20 and FAST 40 protocol domain. In addition to maintaining the ability to switch within required AC timing specifications, such an output driver includes $V_{OH}$ limiting means to limit the $V_{OH}$ to the SCSI specified maximum.

These and other objects are attained in accordance with practice of principles of the invention, by an integrated circuit, including an output driver coupled to a terminated SCSI bus, in which the output driver includes an N-channel pull-up transistor and an N-channel pull-down transistor. The pull-up transistor has a turn-on characteristic in operative response to the magnitude of charge current provided on its gate terminal. A resistor divider network is coupled to the gate terminal and includes a resistor coupled in series with the charge current path and resistor coupled in parallel to the charge current path so as to restrict a control voltage applied to the gate terminal of the output driver's pull-up transistor.

Bypass means are coupled in parallel with the series resistor of the resistor divider network such that when the bypass means are activated, the charge current path is directly coupled through the bypass means to the gate terminal of the pull-up transistor. When the bypass means are inactivated, the charge current path to the gate terminal of the pull-up transistor is through the series resistor of the resistor divider network. Activation and deactivation of the bypass means is controlled by feedback means coupled between an output of the output driver and the bypass means. The feedback means provides activation and deactivation signals to the bypass means in operative response to an output voltage of the output driver. The feedback means activates the bypass means, thus providing a direct charge current path to the gate terminal of the pull-up transistor, when the output voltage is below a pre-set trigger value. The feedback means turns off the bypass means when the output voltage rises above the trigger value, thereby conditioning the charge current path to flow through the series resistor.

In one aspect of the invention, the bypass means comprises an N-channel and P-channel transistor pair configured as a transfer gate, coupled in parallel with a series resistor, and connected between the gate terminal of the pull-up transistor and a pull-up signal source having a characteristic high level voltage. When the output voltage of the output driver is below the trigger value, feedback means maintains the transfer gate in an on condition, such that the pull-up signal source characteristic high level voltage is provided directly to the gate terminal of the N-channel pull-up transistor. When the output voltage reaches and exceeds the trigger value, the feedback means turns off the transfer gate, such that the signal source characteristic voltage is reduced by operation of the resistor divider network, thereby providing a second, lower voltage to the gate terminal of the N-channel pull-up transistor and limiting its $V_{OH}$ maximum value.

In a further aspect of the present invention, the feedback means comprises a trigger circuit connected between the output of the output driver and the gate terminals of the transfer gate transistors. The trigger circuit is configured to maintain the transfer gate in an on condition with the output driver voltage is below a trigger voltage of about 1.0 volts. As the output voltage rises to the trigger voltage of about 1.0 volts, the trigger circuit turns off the transfer gate. In accordance with this aspect of the invention, the signal source characteristic voltage is approximately $V_{DD}$ and is in the range of from about 4.75 volts to about 5.25 volts and the resistor divider network reduces the signal source characteristic voltage applied to the gate terminal of the pull-up transistor to a value in the range of from about 4.5 to about 4.75 volts. Accordingly, as the output driver pull-up begins to turn-on, it exhibits a quick turn-on characteristic. As the pull-up voltage exceeds the trigger value of about 1.0 volts, the feedback and trigger circuit adaptively switches the output driver out of the quick turn-on mode and into the $V_{OH}$ limiting mode.

BRIEF DESCRIPTION OF THE DRAWINGS

These and other features, aspects, and advantages of the present invention will be more fully understood when considered with respect to the following detailed description, appended claims and accompanying drawings, wherein:

DETAILED DESCRIPTION OF THE INVENTION

In accordance with practice of the present invention, an SCSI controller chip such as the 61C96H, manufactured and sold by Adaptec, Inc. of Milpitas, Calif., communicates with an SCSI bus by means of an output driver circuit which includes an efficient design for keeping the maximum output voltage level ($V_{OH}$) within the SCSI specification limit of 3.5 to about 3.8 volts maximum. This efficient design is particularly advantageous when a user desires to connect a new, additional SCSI peripheral apparatus to an already operating SCSI bus (termed in the art a "hot-switch" connection).

Figure 2:
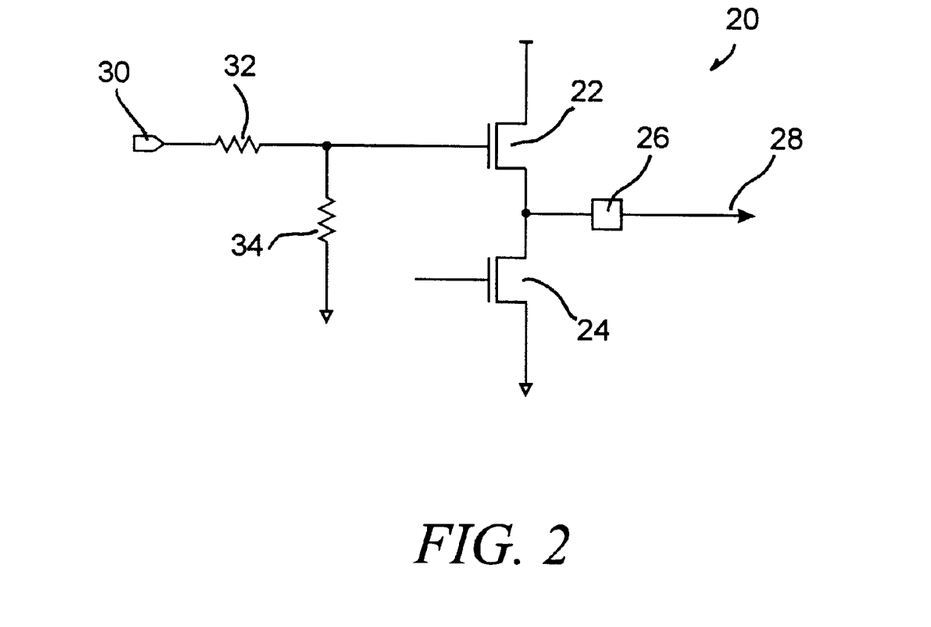
FIG. 2 is a semi-schematic circuit diagram of an exemplary output driver in accordance with the prior art, employing an N-channel pull-up device and an N-channel pull-down device, and a resistive voltage divider for reducing $V_{GS}$ on the N-channel pull-up.

Turning first to FIG. 2, a simplified output driver, such as may be found on conventional SCSI controller chips, is depicted generally at 20. The output driver 20 suitably comprises an N-channel pull-up transistor 22 and an N-channel pull-down transistor 24, connected in series between a first power supply voltage ($V_{DD}$) and a second, lower supply voltage ($V_{SS}$) or ground potential. An output pad 26 receives an output signal from the output driver and is coupled, in turn, to a particular signal line 28 of the SCSI bus. Pull-down N-channel transistor 24 has a gate terminal connected to a pre-driver circuit (not shown), as is common in the art, and is operatively responsive to a logical high signal, received from the pre-driver. The pull-down transistor 24 turns on, thus asserting an active-low signal through the pad 26 to the signal line 28. Since the pull-down portion of the output driver circuit experiences no difficulties with the low-level output voltage specification, it will not be discussed further herein.

In accordance with the prior art, the gate electrode of the pull-up N-channel transistor 22 is coupled to an input 30 which receives a pull-up signal from a pull-up pre-driver circuit (not shown) through a resistor divider network. The resistor divider network comprises a first series resistor 32 connected in series-fashion between the pull-up input 30 and the gate electrode of the pull-up transistor 22. Resistor divider further comprises a second, parallel resistor 34 connected between a node after the series resistor 32 and before the gate electrode of the pull-up transistor 22, and $V_{SS}$ or ground potential. The function of the two resistors 32 and 34 of the resistor divider is to limit the maximum value of the signal swing of the pull-up pre-driver output voltage, from its conventional value of about 5.0 volts ($V_{DD}$) to a value of from approximately 4.5 to about 4.75 volts, as experienced by the gate of the pull-up transistor 22. Limiting the pull-up pre-driver output voltage to about 4.5 to about 4.75 volts on the pull-up gate, causes the high-level output voltage on the pad 26 to be limited to approximately 3.5 to about 3.75 volts. It will be recognized by one having skill in the art that the impedance of values of the two resistors 32 and 34, of the illustrated embodiment of FIG. 2, should be rather large, on one hand, in order to limit the amount of current being dumped across the parallel resistor 34 and, thus power consumption of the circuit. On the other hand, the impedances should be rather small, in order to allow a relatively large current flow through the series resistor 32 in order to more quickly charge up (and thus turn on) the pull-up N-channel transistor 22. Preferably, the series resistor 32 has an impedance in the range of about 4 kOhms, while the parallel resistor 34 has an impedance in the range of about 100 kOhms.

An additional feature which is often desirable for integrated circuits intended to be connected to an active signal bus such as the SCSI bus, is the ability to be "hot-switched" onto the bus while the bus is in an operating condition. Such situation may occur when an external disk drive, zip drive, or tape drive is directly connected onto a SCSI bus while the computer system is operating. Such external peripheral devices may, or may not have been plugged into a power supply prior to their connection to the signal bus. Accordingly, a fully powered-up device may be connected to the SCSI bus or alternatively, an unpowered device may be coupled to the bus and then plugged into a source power. In both cases, there is a possibility for unwanted, spurious signals to be generated onto the bus and in certain cases, false requests, acknowledgments, or data may be transferred between a hot-switch device and a host microprocessor.

Figure 3:
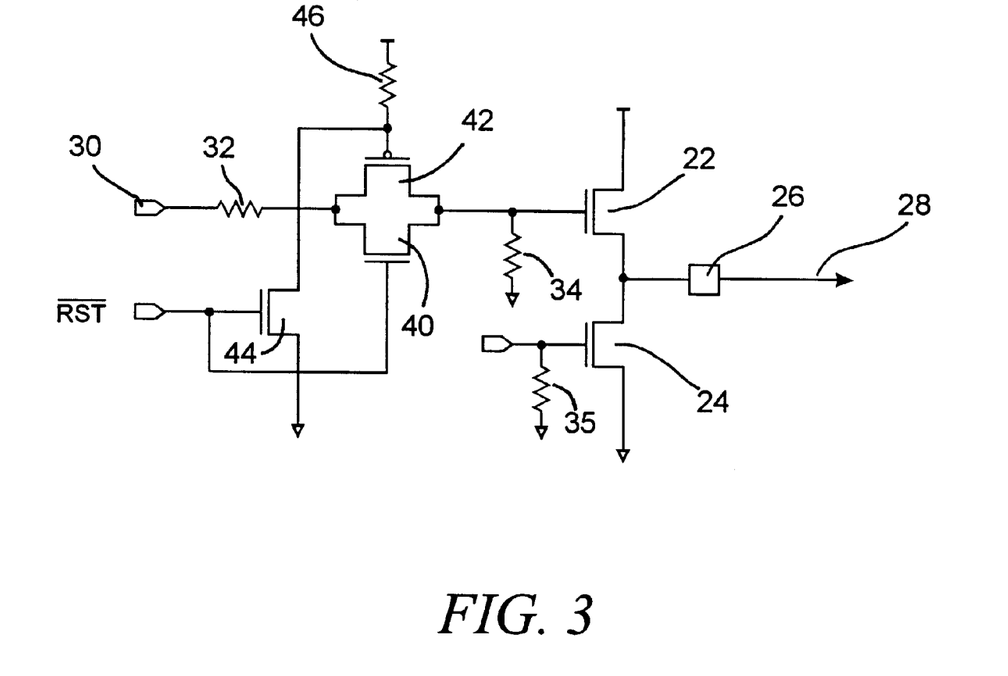
FIG. 3. is a semi-schematic circuit diagram of an output driver in accordance with the prior art, including a resistive voltage divider in combination with a hot-switch circuit.

Various attempts have been made in the prior art to provide a suitable switching circuit between a chip's internal logic circuitry and an output driver, that would prevent any signals from being issued or received by the chip during a device's connection to the SCSI bus. One exemplary embodiment of a hot-switch circuit is depicted in FIG. 3, and suitably comprises an N-channel 40 and a P-channel 42 transistor, connected in parallel-fashion and configured as a transfer gate. The gate terminal of the N-channel transistor 40 is controlled by an active low signal termed reset ($\overline{RST}$), in a manner such that when $\overline{RST}$ goes high (is negated), the N-channel transistor 40 turns on. $\overline{RST}$ is also directed to the gate terminal of an N-channel buffer transistor 44 having its source connected to ground or $V_{SS}$ and its drain terminal connected to a node between the gate terminal of the P-channel transistor 42 of the transfer gate and a resistor 46 to the supply voltage $V_{DD}$. Accordingly, it will be understood that when the $\overline{RST}$ signal is negated high, the N-channel transistor 44 turns on, thus causing a low voltage to be applied to the gate terminal of the P-channel transistor 42 of the transfer gate, thus turning on the P-channel transistor.

The remaining elements of the circuit of FIG. 3 are the same as the circuit elements of FIG. 2 and will be identified with common reference numerals. As was the case in FIG.

2, the exemplary circuit of FIG. 3 includes an output driver having a pull-up N-channel transistor 22 and a pull-down N-channel transistor 24 coupled between $V_{DD}$ and ground or $V_{SS}$, for providing an output signal to a pad 26, coupled in turn to an active signal line 28 of a for example, SCSI bus. The gate terminal of the pull-up N-channel transistor 22 is coupled to, and controlled by, the drain end of the transistor pair transfer gate. A resistor 34 is connected between the gate terminal of the pull-up transistor 22 and ground or $V_{SS}$ in parallel fashion.

The source end of the transfer gate is coupled to a pull-down input 30 which is asserted by a conventional pull-down pre-driver section (not shown). In accordance with convention, a pull-down signal is asserted as an active high. A series resistor 32 is coupled between the input 30 and the source connection of the transfer gate.

In operation, the hot-switch circuit of FIG. 3 operates to maintain both the pull-up and pull-down transistors 22 and 24 in a tri-state condition (a high resistance state) as a device is being connected (hot-switched) onto an operating, powered-up bus. As a device is being coupled to the bus, $\overline{RST}$ is initially asserted low, thus maintaining the N-channel and P-channel transistors 40 and 42 respectively of the transfer gate, as well as buffer transistor 44, in an off condition. Accordingly, the gate node of the pull-up output transistor 22 is pulled-down to $V_{SS}$, through parallel resistor 34. In like manner, the gate node of the pull-down output transistor 24 is pulled-down to $V_{SS}$ through a corresponding resistor 35. Thus, both of the output transistors 22 and 24 will be put into tri-state, thus showing a high resistance to the bus.

After the device is connected to the bus, $\overline{RST}$ is released (negated) high which, in turn, turns on the N-channel transistor 40 of the transfer gate and the P-channel transistor 42 of the transfer gate through buffer transistor 44. The transfer gate now operates normally, switching the series resistor 32 into the circuit and setting-up the resistor divider network to condition the gate voltage of pull-up transistor 22 and thus the circuit's $V_{OH}$.

Accordingly, it will be understood that when the transistor pair transfer gate is open (both the N-channel 40 and P-channel 42 transistors are turned on) the transfer gate may be viewed as a direct conduction path (a straight wire) between its source and drain ends. Thus, when the transfer gate is activated, the integrated circuit of FIG. 3 reduces to the integrated circuit of FIG. 2, wherein a resistor divider (resistors 32 and 34) is configured between the pull-down input 30 and the gate electrode of the pull-down N-channel transistor 22 of the output driver.

It can be thus seen that, the hot-switch circuit of FIG. 3 exhibits the same limitations of the more simplified output driver and resistor divider network of FIG. 2. While the transistor pair transfer gate is an acceptable solution for maintaining the output section in a tri-state condition when a device is coupled to an active bus, incorporating a voltage divider (in the form of a resistor divider network) interposed in the pull-down signal path results in a generally reduced charge current and generally increased charge time on the pull-down N-channel transistor 22.

Figure 4:
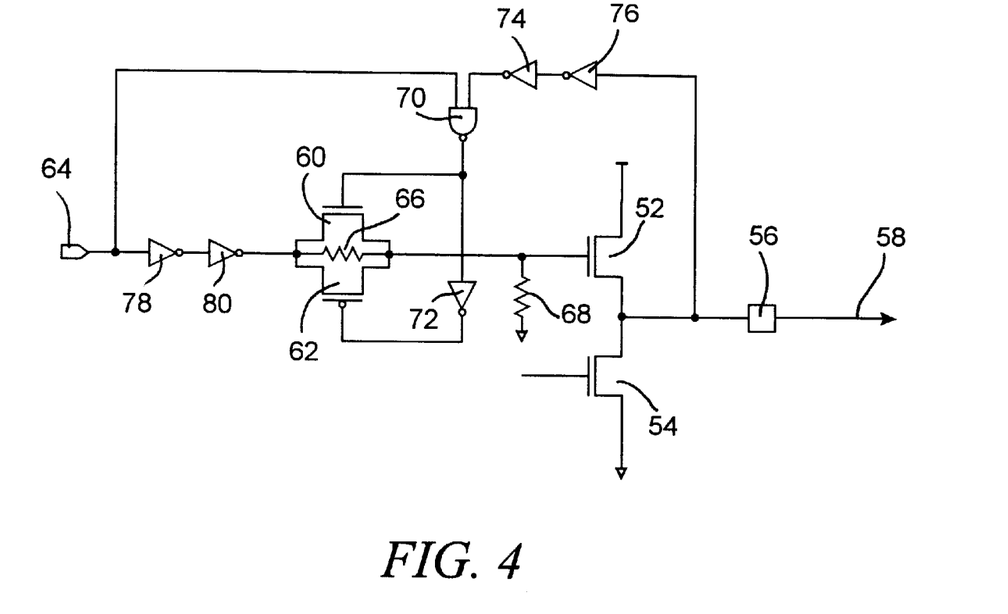
FIG. 4 is a semi-schematic circuit diagram of an output driver with a quick turn-on characteristic in accordance with practice of principles of the invention, including a feedback circuit for controlling $V_{GS}$ and the pull-up charge time.

In accordance with practice of principles of the invention, an SCSI output driver with a quick turn on characteristic is provided, and as will be described in greater detail below, includes circuitry to enable an SCSI peripheral apparatus which incorporates such an output driver to be hot-switchable onto and off an active SCSI bus. Turning now to FIG. 4, the output driver with quick turn on characteristic in accordance with the invention suitably comprises a pair of N-channel pull-up and pull-down output transistors (52 and 54 respectively), coupled in series-fashion between a power supply voltage $V_{DD}$ and ground or $V_{SS}$, in order to provide an output signal to a pad 56, connected in turn to an SCSI bus signal line 58. The gate electrode of pull-up N-channel transistor 52 is coupled to, and controlled by, circuit elements enabling the output driver to be hot-switchable without incorporating a resistor divider network, while at the same time implementing a resistor divider network for maintaining the maximum output voltage level ($V_{OH}$) within the SCSI specification limit of from about 3.5 to about 3.8 volts maximum. An N-channel 60 and P-channel 62 transistor pair are connected together, in parallel-fashion, and configured as a transfer gate with their source and drain nodes coupled between the gate electrode of the N-channel pull-up transistor 52 and an input signal line 64 which receives a pull-up signal from a pull-up pre-driver circuit (not shown). The pull-up signal activates the pull-up transistor 52 in conventional fashion. A resistor 66 is connected between the common source and common drain nodes of the N-channel 60 and P-channel 62 transistor pair of the transfer gate, in effect, being disposed in series-fashion between the pull-up input 64 and the gate electrode of the pull-up N-channel transistor 52, and in parallel-fashion with the transistor elements of the transfer gate.

An additional resistor 68 is coupled between the gate electrode of the pull-up transistor 52 and $V_{SS}$ or ground potential, to thereby form a resistor divider in combination with the series resistor 66 which functions to reduce the pull-up pre-driver signal level on the signal input 64 to a value between about 4.5 to about 4.75 volts as expressed on the pull-up N-channel transistor 52 gate electrode.

In operation, the output driver with quick turn-on in, accordance with the present invention, functions such that the N-channel and P-channel pair transfer gate (60 and 62 respectively) bypasses the series resistor 66 and provides a high value charge current to the gate electrode of the pull-up N-channel transistor 52 during a first portion of the pull-up cycle, preferably to a turn-on voltage of about 1.0 volts. As the pull-up voltage exceeds about 1.0 volts, the N-channel and P-channel transfer gate pair are turned off and charging continues through the series resistor 66. A combination of series resistor 66 and parallel resistor 68 function to limit the gate voltage on the pull-up transistor 52 to a value suitable for limiting the high-level output voltage on the pad 26 to approximately 3.5 to about 3.75 volts. In particular, the series resistor 66 is constructed with an impedance in the range of about 4 kOhms, while parallel resistor 68 is constructed with an impedance in the range of about 100 kOhms.

Operational control of the N-channel and P-channel pair transfer gate is implemented by coupling their respective gate terminals through a feed back circuit, suitably comprising a NAND gate 70 having an active low output directly coupled to the gate electrode of the N-channel transistor 60 of the pair and coupled through an inverting buffer 72 to the gate electrode of the P-channel transistor 62 of the pair. The NAND gate 70 is preferably a two-input NAND gate, with one input connected to receive a signal from the pull-down input 64. The second input of NAND gate 70 is coupled to the output driver's output (effectively to pad 56) through a pair of inverting buffers 74 and 76. The buffer pair 74 and 76 are constructed, in accordance with well known principles, and tuned to be operational when the output voltage of the output driver reaches approximately 1.0 volts. Accordingly, it will be understood that the output of NAND gate 70 will remain at an inactive high until such time as a high-level data signal is received on the pull-up input signal line 64, and the output signal level of the output driver reaches or exceeds 1.0 volts. With NAND gate 70 remaining at an inactive high, both the N-channel 60 and P-channel 62 transistors of the transfer gate pair, are turned on, allowing the rising edge of a high-level signal received at the pull-up input 64 to be transferred directly (thus bypassing the series resistor 66) to the gate electrode of the pull-up N-channel transistor 52 of the output driver section.

In the illustrated embodiment of FIG. 4, a second inverter buffer pair 78 and 80 are provided between the pull-up input 64 and the transfer gate in order to provide a suitable charge current for the gate of the pull-up transistor 52. Although not strictly necessary in the scope of the present invention, the second inverter buffer pair 78 and 80 are preferably included in order to maximize the flexibility of the circuit, with respect to charge current magnitude, phase and impedance matching.

As a high-level data signal is received by the pull-up input 64, the pull-up transistor 52 begins to turn-on. At this time, NAND gate 70 remains in an inactive high state, only one of its two inputs (the input connected to the pull-up input 64) in a logical ONE state. The second input of NAND gate 70 is at a logical zero, until such time as the pull-up transistor 52 pulls the output up to a value of 1.0 volts. Inverter buffers 74 and 76 turn-on in response thereto, bringing the second input of NAND gate 70 to a logical ONE state and thereby putting NAND gate 70 into an active low condition. The active low output of NAND gate 70 puts a zero on the gate electrode of the N-channel transistor of the transfer gate, while inverting buffer 72 puts a logical ONE on the gate electrode of the P-channel transistor of the transfer gate. Both transistors of the transfer gate are thus turned off, leaving only series resistor 66 in the signal path between the pull-up input 64 and the gate electrode of the pull-up transistor 52 of the output driver section.

Accordingly, it will be seen that a first portion of the output driver turn on will be very quickly realized due to the charge current's not having to be directed through the series resistor 66, thus quickly charging the gate capacitance of the pull-up N-channel transistor 52. After the turn-on voltage reaches approximately 1.0 volts, the feed-back means of the circuit of the present invention causes the circuit to put the output driver into a $V_{OH}$ limiting regime, whereby the output driver's $V_{OH}$ maximum is limited to the SCSI specification limit.

It also bears mentioning that the illustrated embodiment depicts an N-channel and P-channel pair, connected in parallel to define a transfer gate for bypassing series resistor 66. Because the pull-up input 64 and inverting buffer pair 78 and 80, in combination, are driving in active high signal, only a P-channel transistor is required to provide an adequate bypass to the series resistor 66. A transfer gate comprising both N-channel and P-channel transistors is depicted and described in connection with the illustrated embodiment in order to provide a measure of safety and redundancy in the bypass circuit by ensuring that transient signal losses have minimal impact on the operation of the transfer gate. It will also be evident to one having skill in the art that the absolute magnitude of charge current, and thus charge time, provided to the pull-up N-channel transistor 52 of the output section, may be adjusted and controlled by an appropriate sizing of the transistor's comprising the inverter buffer pair 78 and 80. Indeed, inverter buffer 78 and 80 may be fabricated with suitable W/L ratios to provide an approximately 40 times increase in the charge current provided to the pull-up transistor 52, in contrast to the conventional charge current provided by conventional $V_{OH}$ limiting circuits such as depicted in FIGS. 2 and 3. With a 40 times increase in charge current, a 40 times decrease in charge time will be expected.

Figure 5:
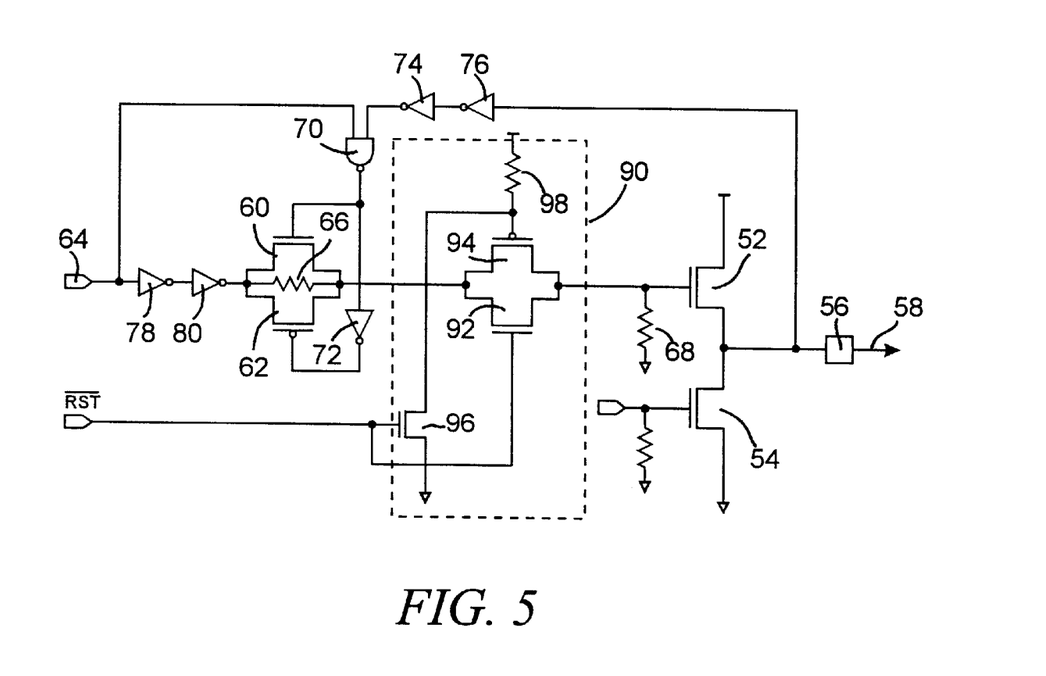
FIG. 5 is a semi-schematic circuit diagram of an output driver in accordance with practice of principles of the invention, including a hot-switch circuit in combination with the quick turn-on circuit of FIG. 4.

Turning now to FIG. 5, there is depicted an SCSI output driver with a quick turn-on characteristic in combination with circuitry to enable an SCSI peripheral apparatus which incorporates such an output driver to be hot-switchable onto and off of an active SCSI bus. Since the illustrated embodiment of FIG. 5 includes an output driver, feedback means, a charge current bypass circuit and a resistor divider network as illustrated in the embodiment of FIG. 4, corresponding elements will be identified with the same reference numerals for ease of description.

In FIG. 5, the output driver with quick turn-on characteristic suitably comprises a hot-switch circuit, indicated generally at 90, disposed in the pull-up transistor's charge current path between series resistor 66 and parallel resistor 68, and thus between the charge current bypass circuit and the gate electrode of pull-up transistor 52. In a manner similar to the embodiment illustrated in FIG. 3, the hot-switched circuit 90 of FIG. 5 suitably comprises parallel-connected N-channel and P-channel transistors, 92 and 94 respectively, configured as a switch or transfer gate. The gate terminal of the N-channel transistor 92 is directly connected to, and controlled by, an active low $\overline{RST}$ which is also connected to the gate electrode of an N-channel buffer transistor 96, source-connected in turn to the gate electrode of the P-channel transistor 94 of the switch. The gate of P-channel transistor 94 is further connected to $V_{DD}$ through a resistor 98.

As was described above, $\overline{RST}$ (when initially asserted low) functions to maintain the output driver comprising pull-up and pull-down transistors 52 and 54 in tri-state until such time as the device is connected to the bus and is negated high. When $\overline{RST}$ is negated high, N-channel transistors 92 and 96 turn on. When buffer transistor 96 turns on, a low voltage is applied to the gate terminal of P-channel transistor 94, thus causing the P-channel to turn on and the transfer gate or switch to appear generally as a straight-wire to the charge current path.

In accordance with the practice of principles of the present invention, a circuit has been described which is able to demonstrate a quick turn-on characteristic in connection with an SCSI output driver while also limiting the maximum $V_{OH}$ level of the output driver to the SCSI specification limit. $V_{OH}$ limiting is accomplished by a resistor divider network which functions to reduce a pull-up pre-driver signal voltage from about 5.0 volts ($V_{DD}$) to a value of from approximately 4.5 to approximately 4.75 volts, which voltage is applied to the gate of the output driver's pull-up N-channel transistor. The quick turn-on characteristic is achieved by bypassing the series resistor portion of the resistor divider network, in accordance with a feedback signal derived from the output voltage of the output driver. As the output voltage reaches approximately 1.0 volts, the series resistor bypass circuit turns-off, putting the circuit in $V_{OH}$ limiting mode.

In addition, in accordance with the present invention, the output driver with quick turn-on and $V_{OH}$ limiting includes circuitry which enables it to be hot-switched onto and off of an active, powered-up SCSI bus. The hot-switch circuitry is interposed in the output driver's charge current path in a manner such that once a device is connected to the bus, the hot-switch circuit reduces to a generally straight-wire configuration so as not to impact the functioning of the quick turn-on and $V_{OH}$ limiting circuitry.

It is contemplated that the output driver with quick turn-on and $V_{OH}$ limiting, be implemented as part of a single monolithic CMOS SCSI integrated circuit, it will be recognized that this is only a convenient vehicle for describing the invention. A circuit having identical functionality may be implemented as a combination of resistors and switches, may be implemented in bipolar technology and may be implemented with individual discrete transistors as opposed to a monolithic circuit.

The above description of an exemplary embodiment of a hot-switchable output driver with quick turn-on and $V_{OH}$ limiting is for illustrative purposes. Because of variations which will be apparent to one having skill in the art, the present invention is not intended to be limited to the particular embodiments described above. Such variations and other modifications and alterations are included within the scope and intent of the invention as described in the following claims.

I claim:

1. An integrated circuit including an output driver coupled to a terminated SCSI bus, the output driver having a quick turn-on characteristic and configured to be hot-switchable onto and off of an active SCSI bus, the integrated circuit comprising:

an output driver including an N-channel pull-up transistor and an N-channel pull-down transistor, the pull-up transistor having a turn-on characteristic in operative response to a charge current magnitude provided on a gate terminal thereof;

a resistor divider network coupled to the gate terminal, the resistor divider network including a resistor coupled in series with the charge current path and a resistor coupled in parallel to the charge current path;

bypass means coupled in parallel with series resistor; and feedback means coupled between an output of said output driver and the bypass means, the feedback means in operative response to an output voltage of said output driver output, the feedback means configured in a first state when said output voltage is below a trigger value, the feedback means first state for maintaining feedback means in an on condition thereby bypassing said series resistor, the feedback means configured in a second state said output voltage is above a trigger value, said feedback means second state turning off said bypass means thereby allowing current flow through said series resistor.

2. The integrated circuit according to claim 1, wherein the bypass means comprises an N-channel and P-channel transistor pair configured as a transfer gate.

3. The integrated circuit according to claim 2, wherein the transfer gate is coupled in parallel with said series resistor and wherein the transfer gate and the series resistor are connected between the gate terminal of the N-channel pull-up transistor and a signal source having a characteristic voltage.

4. The integrated circuit according to claim 3, wherein the feedback means first state maintains the transfer gate in an on condition such that the signal source characteristic voltage is provided to the gate terminal of the N-channel pull-up transistor.

5. The integrated circuit according to claim 4, wherein the feedback means second state turns off the transfer gate, such that the signal source characteristic voltage is reduced by operation of said resistor divider network, thereby providing a second, lower voltage to the gate terminal of the N-channel pull-up transistor.

6. The integrated circuit according to claim 5, wherein the feedback means comprises a trigger circuit connected between the output of the output driver and the transfer gate, the transfer gate in operative response to the trigger circuit, the trigger circuit configured to maintain the transfer gate in an on condition when the output driver output voltage is below a trigger voltage, the trigger circuit turning off the transfer gate when the output voltage rises to the trigger voltage.

7. The integrated circuit according to claim 6, wherein the trigger voltage is about 1.0 volts.

8. The integrated circuit according to claim 7, wherein the signal source characteristic voltage is in the range of from about 4.75 volts to about 5.25 volts.

9. The integrated circuit according to claim 8, wherein the resistor divider network reduces the signal source characteristic voltage applied to the gate terminal of the N-channel pull-up transistor to a value in the range of from about 4.5 to about 4.75 volts, upon the output driver output voltage reaching the trigger voltage thereby causing the trigger circuit to turn the transfer gate off.

10. The integrated circuit according to claim 9, further comprising a buffer connected between the signal source and the transfer gate, the buffer constructed to provide a high magnitude charge current to the gate terminal of the N-channel pull-up transistor.

11. The integrated circuit according to claim 10, wherein the buffer comprises a pair of series-connected invertors, the invertors providing a high magnitude charge current in accordance with their effective channel areas.

12. An integrated circuit for adaptively switching an output driver coupled to a terminated SCSI bus between a first, quick turn-on mode and a second, $V_{OH}$ limiting mode, the integrated circuit comprising:

an output driver including an N-channel pull-up transistor and an N-channel pull-down transistor, the pull-up transistor having a turn-on characteristic in operative response to a charge current magnitude provided on a gate terminal thereof, the pull-up transistor further having a maximum $V_{OH}$ characteristic in operative response to a control voltage magnitude provided on said gate terminal;

a control voltage limiting circuit coupled between the gate terminal of the pull-up transistor and a control voltage signal source;

a charge current bypass circuit coupled between the gate terminal of the pull-up transistor and the control voltage signal source, the bypass circuit further connected in parallel with the control voltage limiting circuit; and feedback means coupled between an output of the output driver and the charge current bypass circuit, the feedback means in operative response to an output voltage of the output driver such that when the output voltage is below a trigger value, the feedback means activates the charge current bypass circuit, thereby providing a direct charge current path between the signal source and the gate terminal of the pull-up transistor, and when the output voltage is above the trigger value, the feedback means deactivates the bypass circuit thereby placing the control voltage limiting means in the charge current path between the signal source and the gate terminal of the pull-up transistor.

13. An integrated circuit according to claim 12, wherein the control voltage limiting circuit comprises a resistor divider network including a resistor coupled in series with a charge current path to the gate terminal of the pull-up transistor and including a resistor coupled in parallel to the charge current path, whereby a characteristic voltage value of the control voltage signal source is reduced by the control voltage limiting circuit before being applied to the gate terminal of the pull-up transistor.

14. An integrated circuit according to claim 13, wherein the charge current bypass circuit comprises an N-channel and P-channel transistor pair configured as a transfer gate, each transistor of the pair including a gate terminal for receiving a bypass control signal.

15. The integrated circuit according to claim 14, wherein the feedback means further comprises an output defining a bypass control signal, feedback means maintaining the bypass control signal in an on condition when the output driver output voltage is below a trigger value, the output voltage reaching said trigger value causing the feedback means to change the bypass control signal to an off condition, thereby deactivating the charge current bypass circuit.

16. The integrated circuit according to claim 15, wherein the output voltage trigger value is about 1.0 volts.

17. The integrated circuit according to claim 15, wherein the feedback means comprises a trigger circuit including a pair of series-connected buffers, the trigger circuit connected between the output of the output driver and the gate terminals of the transfer gate transistor pairs, the transfer gate transistors in operative response to the trigger circuit, the series-connected invertors constructed to be operative in response to a pre-determined input voltage.

18. The integrated circuit according to claim 17, wherein the pre-determined input voltage is about 1.0 volts.

19. The integrated circuit according to claim 18, wherein the signal source characteristic voltage is in the range of from about 4.75 volts to about 5.25 volts.

20. The integrated circuit according to claim 19, wherein the resistor divider network reduces the signal source characteristic voltage applied to the gate terminal of the N-channel pull-up transistor to a value in the range of from about 4.5 to about 4.75 volts, upon the output driver output voltage reaching the trigger voltage, thereby causing the trigger circuit to turn the transfer gate off.

21. An integrated circuit for adaptively switching an output driver coupled to a terminated SCSI bus between a first, quick turn-on mode and a second, $V_{OH}$ limiting mode, the integrated circuit comprising:

an output driver including an N-channel pull-up transistor and an N-channel pull-down transistor, the pull-up transistor having a turn-on characteristic in operative response to a charge current magnitude provided on a gate terminal thereof, the pull-up transistor further having a maximum $V_{OH}$ characteristic in operative response to a control voltage magnitude provided on said gate terminal;

a control voltage limiting circuit coupled between the gate terminal of the pull-up transistor and a control voltage signal source;

a charge current bypass circuit coupled between the gate terminal of the pull-up transistor and the control voltage signal source, the bypass circuit further connected in parallel with the control voltage limiting circuit;

feedback means coupled between an output of the output driver and the charge current bypass circuit, the feedback means in operative response to an output voltage of the output driver such that when the output voltage is below a trigger value, the feedback means activates the charge current bypass circuit, thereby providing a direct charge current path between the signal source and the gate terminal of the pull-up transistor, and when the output voltage is above the trigger value, the feedback means deactivates the bypass circuit thereby placing the control voltage limiting means in the charge current path between the signal source and the gate terminal of the pull-up transistor; and a hot-switch circuit, operatively coupled to a reset signal, for placing the N-channel pull-up and N-channel pull-down transistors into tri-state in response to reset being in a first logical state, the hot-switch circuit releasing the N-channel pull-up and N-channel pull-down transistors from tri-state in response to reset being in a second logical state.

22. The integrated circuit according to claim 21, wherein the hot-switch circuit is coupled between the charge current bypass circuit and the gate terminal of the N-channel pull-up transistor.

23. The integrated circuit according to claim 22, wherein the hot-switch circuit is disposed in the direct charge current path between the signal source and the gate terminal of the pull-up transistor, the hot-switch circuit configured to function as a straight-wire along the direct charge current path when the reset signal is in the second logical state.

* * * * *